Oct. 17, 1967 C. G. LAKE ETAL 3,346,913
CALENDER WITH ADJUSTABLE STRIPPING ROLLS
AND REMOVABLE EMBOSSING ROLLS
Filed Nov. 24, 1965 5 Sheets-Sheet 1

(TYPICAL PRIOR ART)

INVENTORS
CHARLES G. LAKE &
BY REX C. SEANOR

Oldham & Oldham
ATTORNEYS

INVENTORS
CHARLES G. LAKE &
BY REX C. SEANOR

Oldham & Oldham
ATTORNEYS

Oct. 17, 1967 C. G. LAKE ETAL 3,346,913
CALENDER WITH ADJUSTABLE STRIPPING ROLLS
AND REMOVABLE EMBOSSING ROLLS
Filed Nov. 24, 1965 5 Sheets-Sheet 4
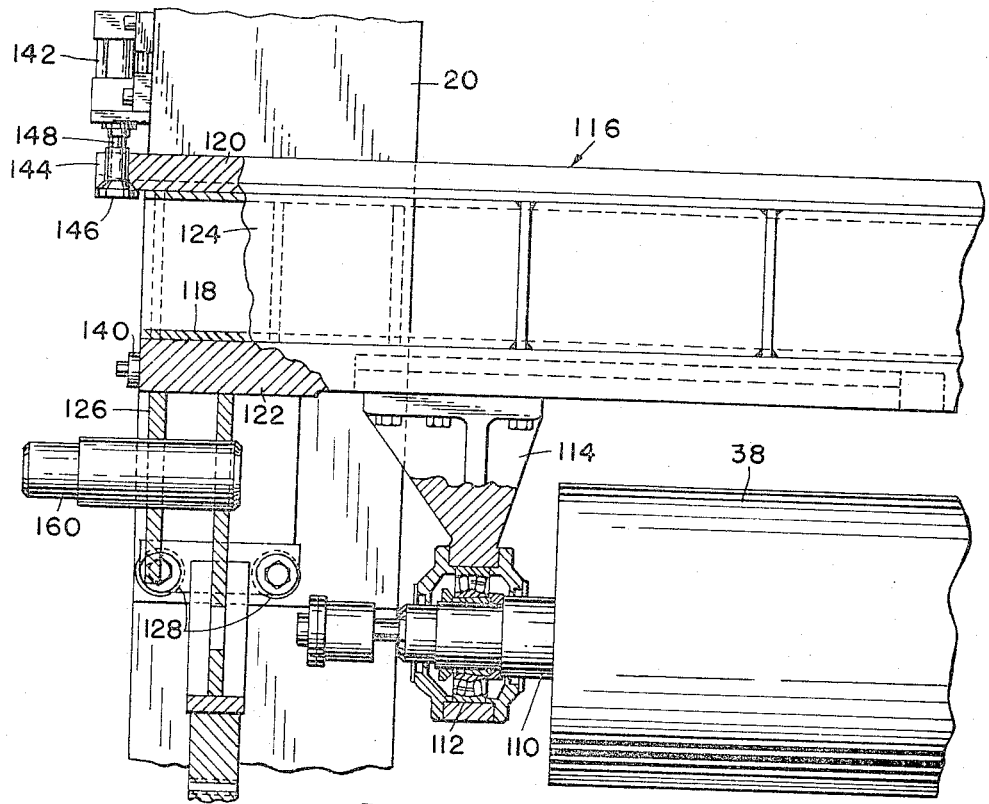
FIG. 5
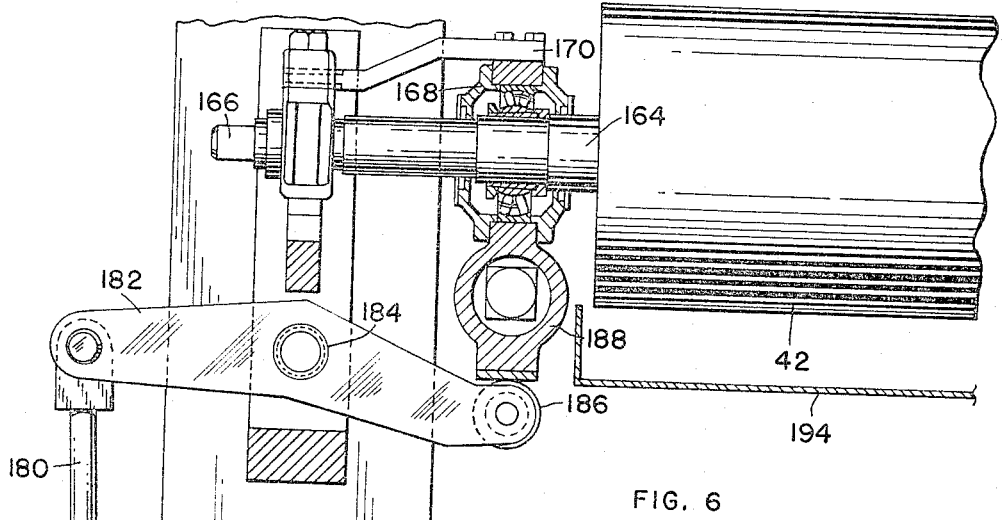
FIG. 6
INVENTORS
CHARLES G. LAKE &
BY REX C. SEANOR
*Oldham & Oldham*
ATTORNEYS Oct. 17, 1967 C. G. LAKE ETAL 3,346,913
CALENDER WITH ADJUSTABLE STRIPPING ROLLS
AND REMOVABLE EMBOSSING ROLLS
Filed Nov. 24, 1965 5 Sheets-Sheet 5

INVENTORS
CHARLES G. LAKE &
BY REX C. SEANOR
Oldham & Oldham
ATTORNEYS

United States Patent Office 3,346,913
Patented Oct. 17, 1967

3,346,913
CALENDER WITH ADJUSTABLE STRIPPING ROLLS AND REMOVABLE EMBOSSING ROLLS
Charles G. Lake and Rex C. Seanor, Akron, Ohio, assignors to Adamson United Company, Akron, Ohio, a corporation of Ohio
Filed Nov. 24, 1965, Ser. No. 509,581
5 Claims. (Cl. 18—2)

ABSTRACT OF THE DISCLOSURE

A calender having embossing and stripping rolls operatively mounted to the frame of the calender but wherein means are provided which allow selective removal of the embossing rolls through windows in the frame of the calender and which allow selective adjustment of the position of the stripping rolls in relation to the calender rolls.

---

This invention relates to calenders for sheeting plastic, rubber, and the like into relatively thin continuously moving webs, and including adjustable stripping rolls and removable embossing rolls.

Heretofore in the manufacture of thin wide continuous plastic webs which are embossed it has been the usual practice to produce the web on a roll-type calender from which the web is stripped by rolls positioned adjacent to the calender rolls, the web then passing to embossing rolls positioned down-stream from the stripping rolls and outside of the calender frame after which the web is passed over cooling drums before being wound up. In apparatus of this known prior art type it has normally been necessary to break the web or stop the apparatus in order to change embossing and or back up rolls. In addition, the physical separation of the stripping rolls and the embossing rolls from the calender has added complications rendering it difficult to maintain a high uniformity of gage, surface finish, embossing depth, and other physical variables in the web under all conditions of operation.

It is the general object of the present invention to avoid and overcome the foregoing and other difficulties of proper art apparatus and practices by the provision of a web forming calender wherein stripping and embossing rolls are mounted directly in the calender frame to provide greater uniformity in the web produced and wherein the embossing roll means can be changed without breaking the web or stopping the calender.

Another object of the invention is to provide apparatus of the character described wherein the stripping rolls can be adjusted to strip the web from either one of two different calender rolls and after a selected angle of circumferential travel of the web on either calender roll.

Another object of the invention is to provide in apparatus such as described embossing roll means mounted directly in the calender housings but readily removable laterally through windows in the housings so as to facilitate changing the roll means.

Another object of the invention is the provision of web guiding rolls in association with the embossing rolls and adjustable to hold the web so it will not touch either embossing roll, together with mechanism for mounting the embossing rolls so that either roll can be moved from operating position and be replaced.

The foregoing objects of the invention, and other objects which will become apparent as the description proceeds, are achieved by the combination in a plastics and rubber calender of a pair of laterally opposed housings, a plurality of calender rolls mounted between the housings, an embossing roll and a companion rubber roll, a separate bridge means mounting each of the embossing roll and the rubber roll, the ends of each bridge means being received in opposed windows in the housings, means releasably mounting each bridge means and its roll for sliding removal through one of the opposed windows of the housing, stripping roll means extending between the housings between the embossing roll and the web discharge bite of the calender rolls, means to adjust the position of the stripping roll means to strip the calendered web from either calender roll forming the discharge bite and after a selected angle of travel on the roll, web guiding means positioned downstream from the embossing roll and journalled between the housings, and means for adjusting the position of the web guiding means to hold the calendered web away from both the embossing roll or the rubber roll.

For a better understanding of the invention reference should be had to the accompanying drawings wherein:

FIGURE 5 is a view, partially in section and taken substantially on line 5—5 of FIGURE 4 of the engraved embossing roll and its manner of mounting;

FIGURE 6 is a fragmentary view, partially in section, and taken substantially on line 6—6 of FIGURE 4 and illustrating the rubber roll engaging with the engraved embossing roll and forming part of the embossing roll means;

Figure 1:
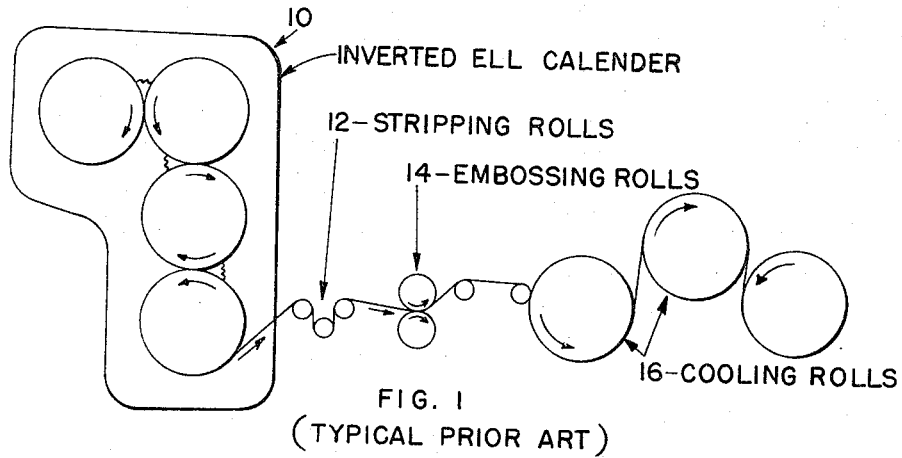
FIGURE 1 is a diagrammatic showing of a typical prior art apparatus for making an embossed plastic web and including an inverted L calender, stripping rolls, embossing rolls, and cooling rolls.

In the drawings, and looking particularly at FIGURE 1, the numeral 10 indicates generally an inverted L calender of well known type and showing stripping rolls 12, embossing rolls 14, and cooling drums 16 all positioned in turn downstream from the calender to emboss plastic film or webs made on the calender. This is a typical prior art arrangement.

Figure 2:
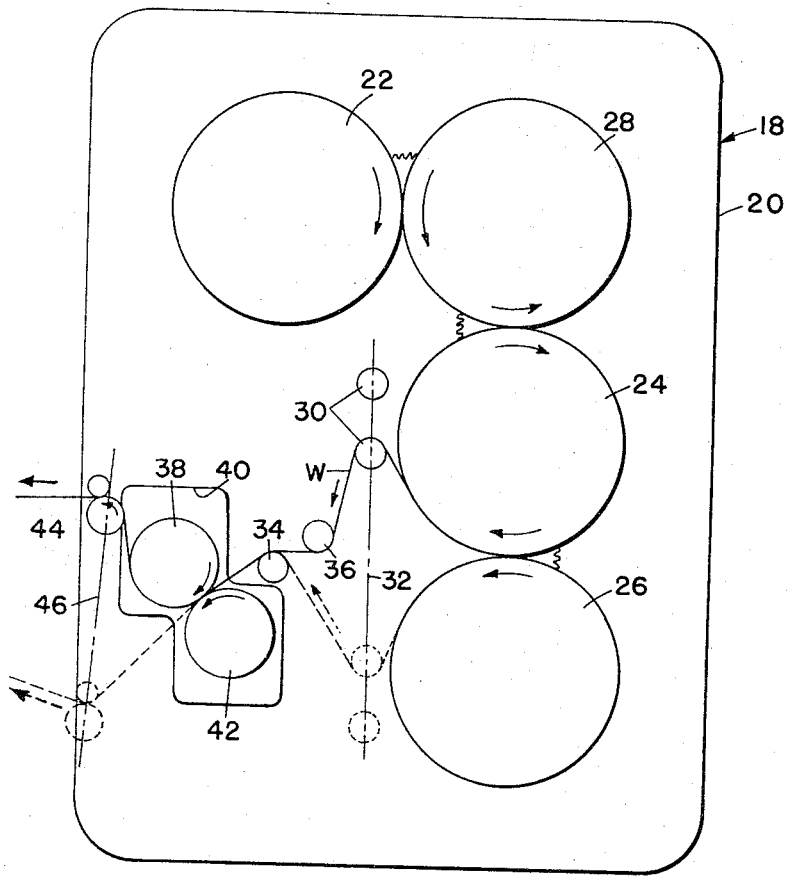
FIGURE 2 is a diagrammatic illustration of the apparatus of the present invention in the form of an inverted L calender wherein the stripping rolls, embossing rolls, and downstream guiding rolls are all mounted in the calender housing.

Turning now to FIGURE 2 of the drawings, this diagrammatically illustrates one best known embodiment of apparatus incorporating the principles of the present invention and in which an inverted L calender, indicated as a whole by the numeral 18 is provided with substantially rectangular housings 20 so that extra housing space is provided in the calender substantially vertically beneath the short leg of the L formed by the rolls and substantially horizontally opposite the long leg of the L formed by the calender rolls. Such extra housing space allows a pair of stripper rolls 30 to be mounted closely adjacent rolls 24 and 26 of the calender. The stripping rolls 30 are mounted for vertical adjustment on mechanism 32 so that the stripping rolls can be moved from the full line position shown in FIGURE 2 where they strip the web W from calender roll 24 to the dotted line position shown where they strip the web W from the calender roll 26. Stationary guide rolls 34 and 36 mounted in the housing 20 receive the web W from the stripping rolls 30 in either the full line or the dotted line position thereof and direct the web into the embossing roll means. The embossing roll means include an engraved roller 38 journalled at its ends in windows 40 of the housings 20 and a rubber roller 42 journalled at its ends in extensions of the windows 40, with both embossing roll means 38 and 42 being laterally removable through one window 40 as hereinafter described.

A pair of guide or stripper rolls 44 receive the web W from the embossing roll means 38–42, the guide rolls 44 being journalled likewise in the calender housings 20, but adjustable by mechanism 46 for substantially vertical movement from the full line position shown to the dotted line position whereby the web W can be held either against the engraved roll 38 or against the rubber roll 42, or in a position to touch neither roll with one roll moved to a clearance position. This permits one or the other roll to be replaced without stopping the movement of the web.

Figure 3:
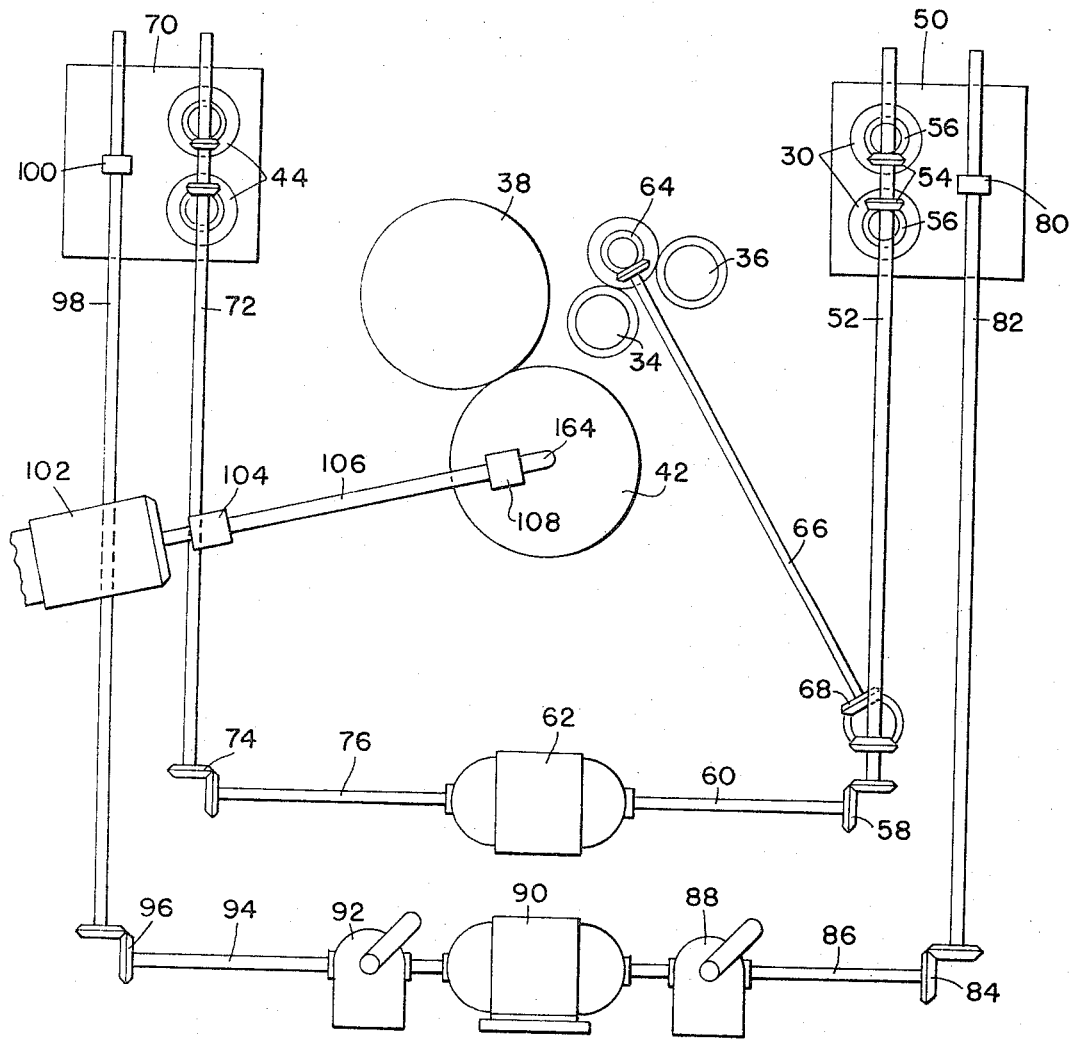
FIGURE 3 is a diagrammatic illustration of the mechanism for driving and adjusting various of the rolls in the apparatus of the invention.

FIGURE 3 diagrammatically illustrates which of the rolls in the apparatus of FIGURE 2 are driven, and shows also the manner of adjustment of certain of the rolls. The calender rolls 22, 24, 26, and 28, are all driven and mounted in known manner which needs no illustration or description. Stripping rolls 30 have their ends journalled in boxes 50 each vertically slidable upon a splined shaft 52 which slidably mounts bevel gears 54 journalled in the box 50 and engaging with beveled gears 56 on the ends of the stripping rolls 30. The splined shaft 52 is rotated by means of bevel gearing 58 from a shaft 60 connected to a direct current gear motor 62 which is connected into the calender train in known manner so that the surface speed of the stripping rolls 30 is the same as the surface speed of the driven calender rolls.

Web guiding rolls 34 and 36 are driven by means of bevel and spur gears indicated generally at 64 and connected to a shaft 66 which in turn is connected through bevel gearing 68 to splined shaft 52.

Web guiding rolls 44 have their ends journalled in boxes 70 and are each slidable on a splined shaft 72 which drives the rolls 44 by means of bevel gearing like that illustrated at 54 and 56 and previously described. Each splined shaft 72 is driven through beveled gearing 74 from a shaft 76 connected also to the motor 62 so that web guiding rolls 44 are driven with a surface speed equal to the surface speed of the calender train.

Mechanism is provided for vertically adjusting the boxes 50 and 70 whereby the stripping rolls 30 can be moved to any position between the full line and the dotted line positions of FIGURE 2 or 3, and so that in like manner the web guiding rolls 44 can be adjusted to any position between the full line and the dotted line positions of FIGURES 2 and 3. To this end, each box 50 is provided with a nut 80 positioned on a threaded shaft 82 which is rotated by bevel gearing 84 from a shaft 86 extending through a speed changing and clutching means 88 to an alternating current motor 90. In like manner, the motor 90 drives through a clutching and change speed means 92 a shaft 94 which operates through bevel gearing 96 to rotate a pair of threaded shaft 98 on which is mounted a nut 100 carried in each box 70 whereby the vertical position of the web guiding rolls 44 can be controlled. It will be understood that the boxes 50 are provided at each of the ends of the stripping rolls 30 adjacent each housing 20 of the calender with a screw 82 being provided for each box 50 to control the vertical height thereof. Ordinarily, the stripping rolls 30 are only driven from one end so that only a single driving spline shaft 52 is required. In the same manner, the guide rolls 44 are mounted in boxes 70 at each of the ends of the rolls, the boxes 70 being positioned closely adjacent the calender housings 20, and with a screw 98 and nut 100 being provided for each box, but with only a single splined driving shaft 72 effecting the drive of the guiding rolls 44 from one end thereof.

FIGURE 3 further diagrammatically indicates that usually only the rubber roll 42 of the embossing roll means 38–42 is driven. The driving of rubber roll 42 is accomplished from a motor 102 operating through universal coupling 104 and a drive shaft 106 and connected by a stab-in coupling 108 to the shaft 164 extending from the end of the roll 42. The motor 102 is connected in the calender train control so that the surface speed of the rubber roll 42 is equal to the surface speed of all of the driven rolls in the calender train.

Figure 4:
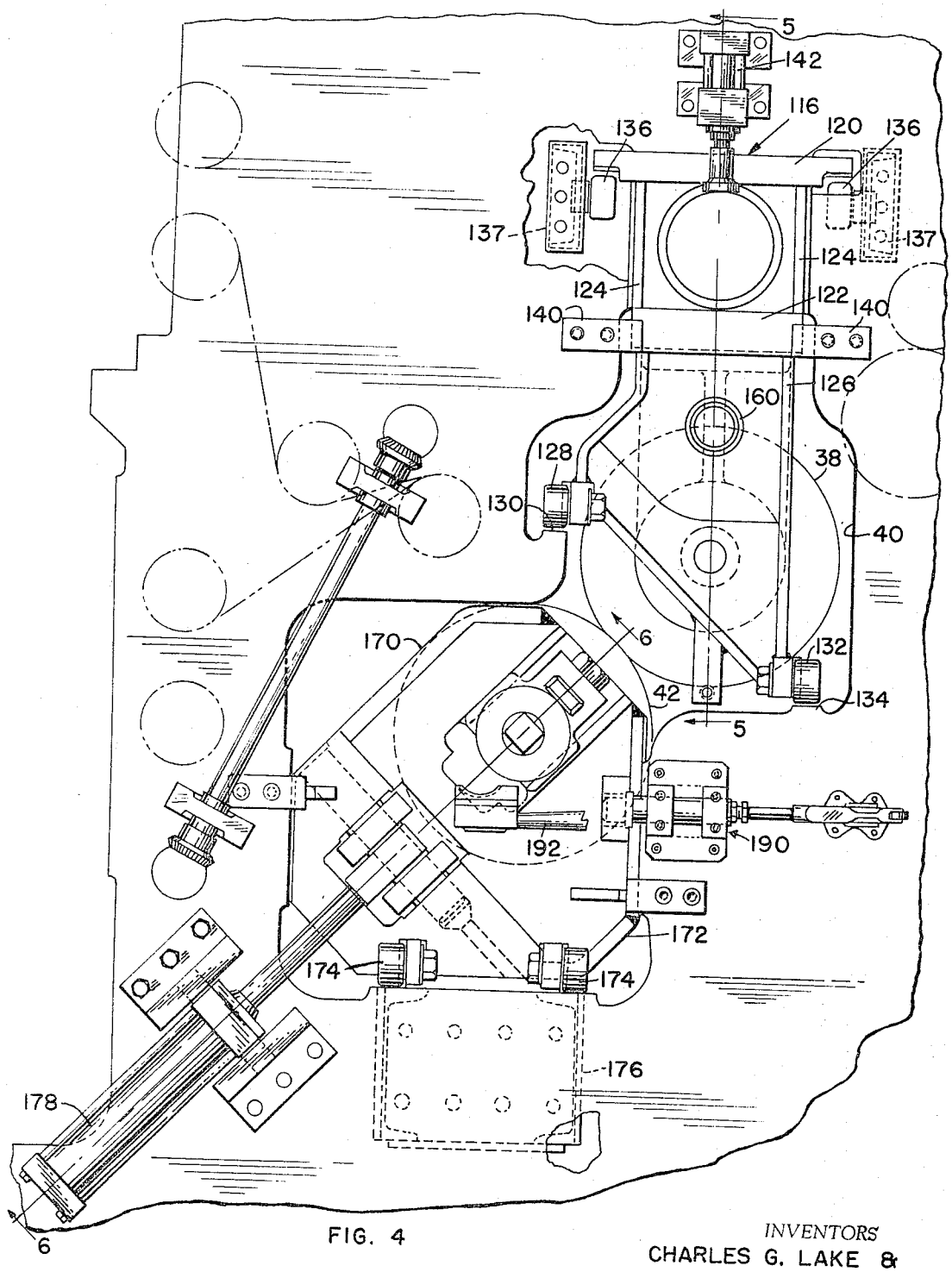
FIGURE 4 is an end elevation, mostly broken away, of the embossing roll means and their manner of mounting.

Coming now to FIGURES 4, 5 and 6 of the drawings, these more specifically illustrate the manner of releasably mounting the embossing rolls 38–42 in the housings 20, and particularly the windows 40 of the calender housings. Specifically, the embossing roll 38 has a stub axle 110 extending from each end thereof which is received in a bearing 112 mounted in the eye of a downwardly extending bracket 114 secured to a bridge section indicated as a whole by the numeral 116. The bridge 116 includes a tubular member 118 to which is secured a top plate 120 and a lower plate 122 and side plates 124 extending between the top plates 120 and 122 and welded thereto to provide a box-like beam or bridge carrying the embossing roll 38. Also secured to the bridge 116 at one end thereof is a downwardly extending bracket 126 carrying at one side a pair of rollers 128 which engage with a shelf 130 formed at one side of the calender window 40, in the manner best seen in FIGURE 4. The bracket 126 also carries a pair of rollers 132 at its other side engaging with a shelf 134 likewise formed in the window 40 of the calender housing. It is likewise advisable to provide a plurality of rollers 136 journalled on stub axles mounted in channel beams 137 extending between the calender housing at the top edges of the window 40, these rollers 136 being adapted to engage with the lateral edges of the plate 120 of the bridge 116 during the complete withdrawal of the bridge.

Figure 7:
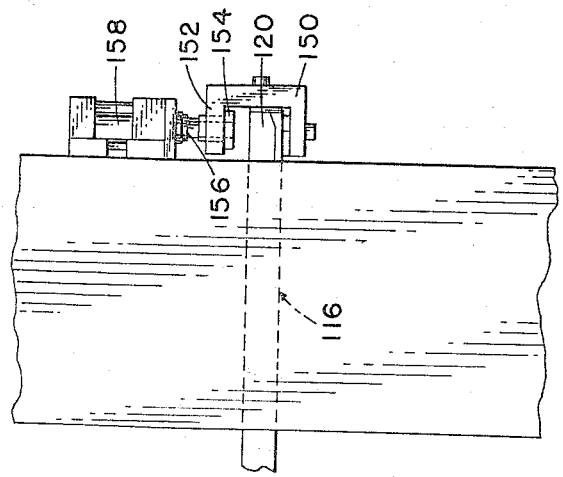
FIGURE 7 is a fragmentary side elevation of the manner of mounting the bridging means journalling the engraved embossing roll.

Stops 140 are provided at each side of the left housing window 40 in the calender to limit the movement of the bridge 116 to the left as seen in FIGURE 5 when the bridge 116 and embossing roll 38 are fully introduced into the calender. To lock the bridge 116 and embossing roll 38 in position when one end of the bridge is against the stops 140 a hydraulic cylinder 142 is provided on the calender housing adjacent the left end of the bridge 116, with the plate 120 being provided with a bifurcation 144 which receives a headed plug 146 secured to the lower end of a piston rod 148 of the hydraulic cylinder 142. At the other end of bridge 116 (note FIG. 7) the plate 120 is extended in the manner illustrated and is provided with a C-shaped bracket 150 having a bifurcated leg 152 which stabs over the top of a headed plug 154 secured to the lower end of a piston rod 156 of a hydraulic cylinder 158 secured to the other housing 20 of the calender. In the manner described, as the bridge 116 with the embossing roll 38 carried thereby is rolled into the windows of the calender housings each end of the plate 120 engages with the headed plugs on the hydraulic cylinders 142 and 158. Then by energizing these cylinders the plate 120 and the bridge 116 is lifted upwardly the short distance shown against the top of the windows 40 of the calender and lifting the bridge off of the rolls 136 and lifting the rolls 128 and 132 off of the tracks 130 and 134 to thereby firmly lock the bridge 116 and the embossing roll 38 in the windows of the calender.

A stub shaft 160 is usually mounted in association with the bracket 126 at each end of the bridge 116 so that the bridge 116 and its associated embossing roll 38 can be handled by a chain hoist once the assembly is removed from the calender.

Rubber covered roll 42 of the embossing rolls 38–42 is likewise mounted in a box carried on rollers so that this entire roll can be removed through the windows 40 of the calender housings. Specifically, the roll 42 is formed with a stub shaft 164 at each end, and at the end of the shaft 64 shown in FIGURE 6 a squared drive connection 166 is provided. Each shaft 164 is carried in a bearing 168 mounted in brackets 170 secured to the end of a bridging plate 172. The bridging plate 172 rotatably journals rollers 174 which roll upon a bridge 176 extending between the housings 20 of the calender immediately beneath the windows 40. In this manner the entire rubber roll 42 and its mounting means can be rolled into or out of the lower portions of the windows 40 in the calender housings 20.

In order to press the rubber roll 42 into cooperating relation with the embossing roll 38 pressure cylinders 178 are mounted on each calender housing near the window and the piston rod 180 of each pressure cylinder is pivotally connected to a bell crank 182 pivotally mounted at 184, with the other end of the bell crank 182 carrying a roller 186 which engages with the underside of member 188 engaging with the underside of the bearing 168.

Figure 9:
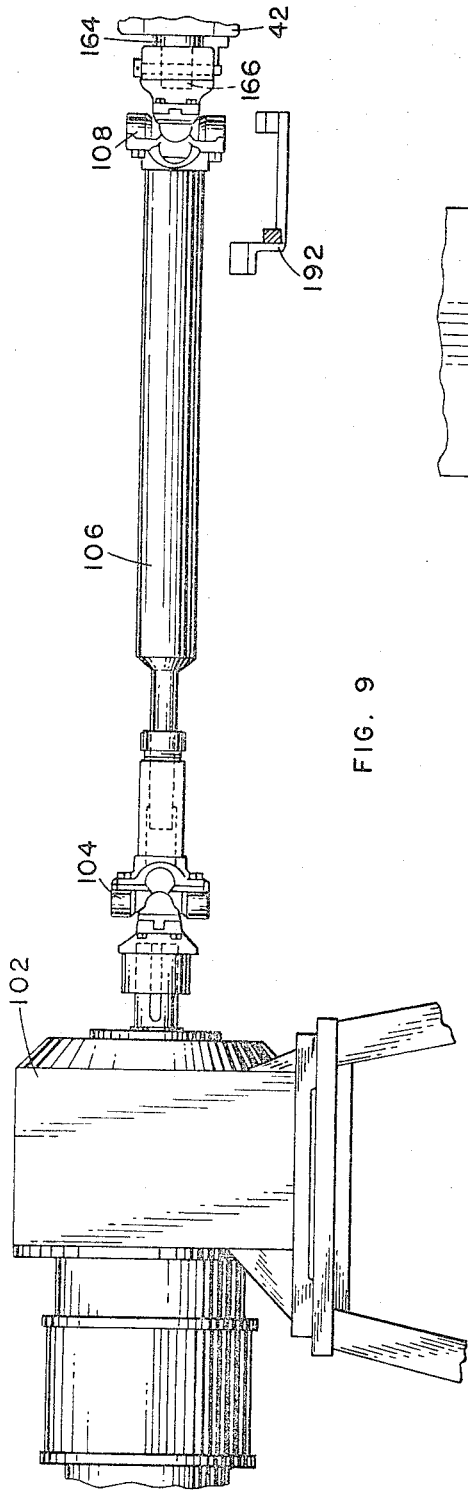
FIGURE 9 is a fragmentary side elevation illustrating the releasable drive means for the rubber roll of the embossing roll means.
Figure 8:
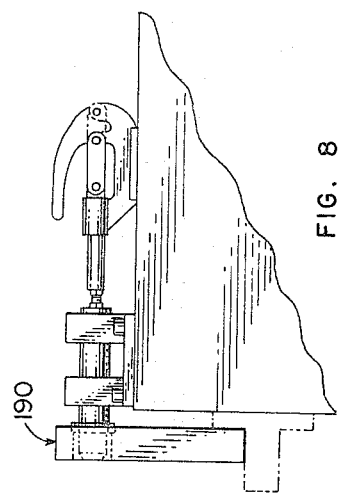
FIGURE 8 is a side elevation of the locking mechanism for securing the rubber roll of the embossing rolls in the apparatus.

Toggle lock means, indicated as a whole by the numeral 190, and best seen in FIGURES 4 and 8, serve to lock the rubber roll 42 in the calender housings. Having reference to FIGURES 4 and 9, a support arm 192 is mounted on the calender housing 20 in position to extend into the window 40 adjacent the left driving end of the rubber roll 42 beneath the right hand end of drive shaft 106, as seen in FIGURE 9. This figure also shows the universal joint 104 connecting the drive shaft 106 with the motor 102 driving the roll 42. A stab-in coupling 108 connects the right hand end of the drive shaft 106 releasably to the squared end 166 of the shaft 164 mounting the roller 42. Thus, when the roll 42 is removed from the calender the right hand end of drive shaft 106 drops down upon the support arm 192. In returning the rubber roll 42 to its position in the calender housings it is necessary to raise the right hand end of drive shaft 106 to align it with the axis of roll 42 whereby stab-in coupling 108 acts to join the drive shaft 106 in driving relation with the roll 42 upon complete inward movement of the roll 42 into the calender housings in which position it is locked by the mechanism 190.

It is believed that the operation of the apparatus will be quite well understood from the foregoing description. Suffice it to say here that one of the features of the invention is a controlled stripping of the web W from either the calender roll 24 or the calender roll 26 in the operation of the apparatus. This is achieved by moving stripping rolls 30 to any position between the full line position and the dotted line position shown in FIGURE 2. In this manner the web W can be stripped at any desired circumferential angle of up to almost 70° on the roll 24 from the bite between rolls 24 and 26, and in like manner can be stripped at any similarly selected angle from roll 26 in relation to the bite between the rolls 24 and 26. Accordingly, it is possible to adjust the position of the stripping rolls so that stripping of the web from one or the other of the calender rolls is effected in a most uniform manner possible over the entire width of the web without stretching either the center or the edges of the web. In other words, a straight line stripping of the web from the selected calender roll can be better achieved whereas in existing operations the stripping of the web from the calender roll has often tended to occur on a long arc resulting in non-uniformly stretching the web.

By adjusting the position of the web guide or stripper rolls 44 from the full line position to the dotted line position shown in FIGURE 2 or to a position therebetween the web W can be held spaced from both the roll 38 and the roll 42 of the embossing rolls 38–42 when one of the rolls is moved away from the other. For example, the rubber roll 42 can be dropped a short distance away from the roll 38 to leave moving web W free of both rolls. The release of the pressure cylinders 178 and 190 effects the dropping of the roll 42. Now the entire rubber roll 42 and its roller mounting means can be pulled laterally out of the windows 40 of the calender housings 20. Usually a stand, not shown, is provided at the side of the calender to slidably receive the roll. The rubber roll 42 can then be cleaned, serviced, or otherwise replaced and can be re-inserted into the apparatus by reversal of the operations described.

In like manner, with the rubber roll 42 dropped, and the web W held clear of rubber roll 42 and embossing roll 38, the hydraulic cylinders 142 and 158 holding the embossing roll 38 and its support mechanism in the calender are released. Now the embossing roll 38 can be removed laterally through the windows 40 of the calender housings 20, this roll also being received on a narrow table, not shown, positioned at the side of the calender to receive it. The embossing roll is then cleaned, serviced, or simply replaced with an embossing roll of a different size, design, or the like whereupon it and its support mechanism can be reinserted in the calender apparatus by reversal of the operations described.

Replacing either the embossing roll 38 or the rubber roll 42 can be accomplished in the manner described without stopping the movement of the web W through the calender, or breaking the web and this is highly advantageous. Additionally, mounting the embossing rolls, the stripping rolls and the various guiding rolls for the web in the calender housings themselves in the manner illustrated and described has the considerable advantage of effecting the embossing the web W very closely adjacent to the bite of the lower calender rolls 24–26 and further provides a very rigid and rugged mounting for all of the rolls.

The rubber roll 42 may be provided with a water pan 194 movable into operating relation with the lower portion of the roll 42, and with a squeegee roll, not shown, likewise movable into operating relation with the surface of roll 42 to render the coating of water thereon uniform, but inasmuch as these mechanisms are known in association with the rubber roll they have not been illustrated nor will they be described in detail.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a plastics and rubber calender of a pair of laterally opposed housings, a plurality of calender rolls mounted between the housings, an embossing roll and a companion rubber covered roll, a separate bridge means mounting each of the embossing roll and the rubber covered roll, the ends of each bridge means being received in opposed windows in the housings, means releasably mounting each bridge means and its roll for sliding removal through one of the opposed windows of the housing, stripping roll means extending between the housings downstream from the web discharge bite of the calender rolls and positioned between the embossing roll and the web discharge bite of the calender rolls, and means to adjust the position of the stripping roll means to strip the calendered web from either calender roll forming the discharge bite and after a selected angle of travel on the roll.

2. The combination in a plastics and rubber calender of a pair of laterally opposed housings, at least two vertically aligned calender rolls operatively mounted between the housings, stripping roll means extending between the housings parallel to the calender rolls downstream from and adjacent to the web discharge bite of the calender rolls, means to adjust the position of the stripping roll means in relation to the calender rolls to strip the calendered web from either calender roll forming the discharge bite and after a selected angle of travel up to about 70° on the selected roll, and means operatively connected to all stripping roll means to drive the same in all positions of adjustment.

3. The combination defined in claim 1 including pressure means provided for moving the embossing roll and its companion rubber covered roll together and apart from each other, web guiding and stripping roll means positioned downstream from the embossing and rubber covered rolls, and means for adjusting the position of the web guiding and stripping roll means to hold the continuously moving web free of both the embossing and rubber covered roll whereby either can be removed.

4. The combination defined in claim 3 wherein means are provided for driving all stripping roll means in all positions of adjustment.

5. The combination defined in claim 4 wherein the calender is of the inverted L type with four calender rolls journalled in opposed inverted L-shaped windows in the calender housings, said housings having an additional pair of laterally-opposed windows positioned below the short leg of the L of the rolls and in about horizontal alignment with the bite of the two lower rolls of the long leg of the L, and with said last-named laterally opposed windows being the ones journalling the embossing roll and its companion rubber covered roll.

References Cited

UNITED STATES PATENTS

| | | | |
|---|---|---|---|
| 1,193,659 | 8/1916 | Aldrich | 100—73 |
| 2,686,413 | 8/1954 | Roubloff et al. | 100—162 X |
| 2,946,087 | 7/1960 | Haroldson et al. | 18—2 X |
| 3,274,923 | 9/1966 | Munch | 100—152 X |

FOREIGN PATENTS

| | | |
|---|---|---|
| 145,631 | 3/1952 | Australia. |

WILLIAM J. STEPHENSON, *Examiner.*